Patented Feb. 28, 1950

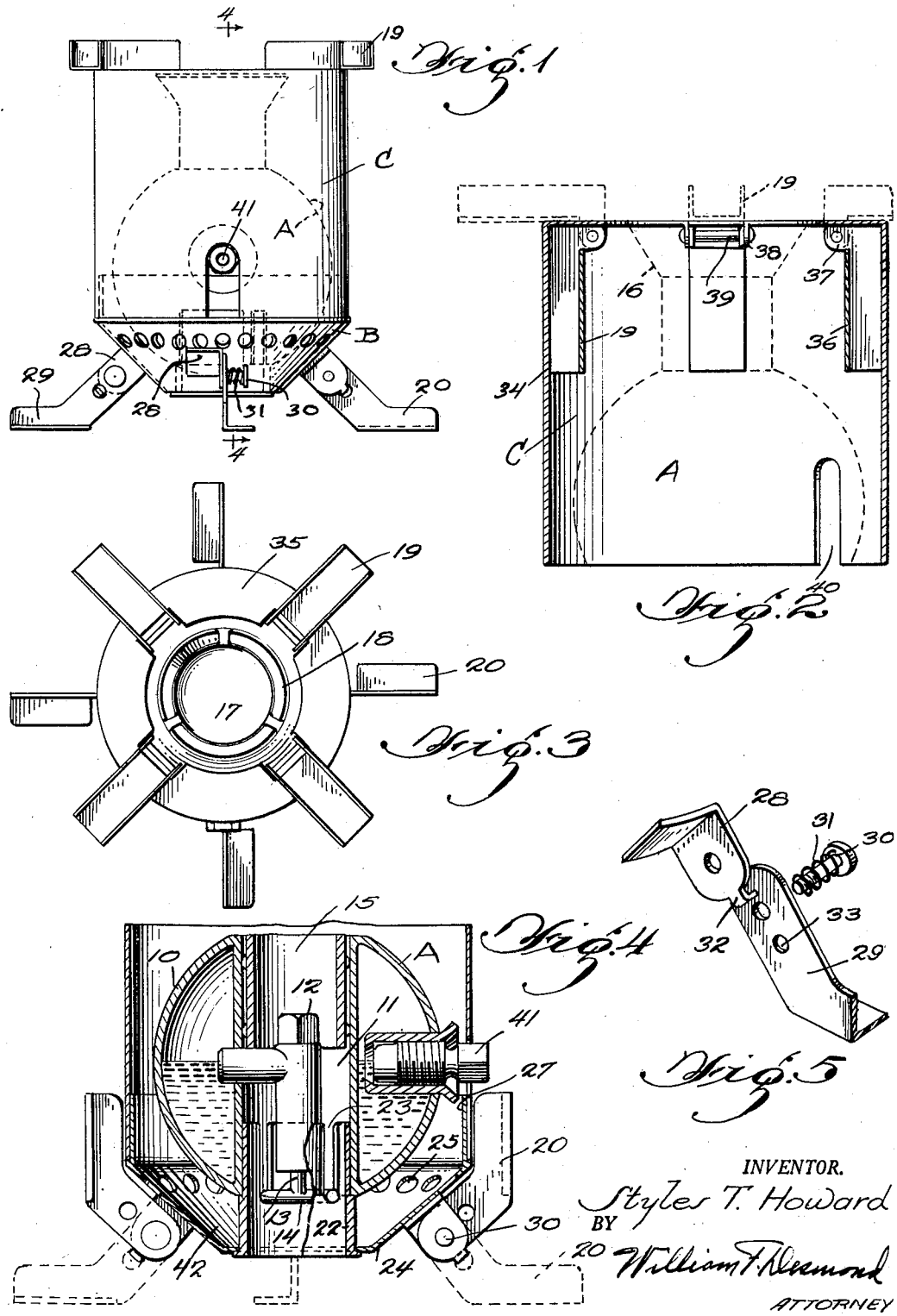

2,498,682

UNITED STATES PATENT OFFICE 2,498,682

PORTABLE GASOLINE STOVE

Styles T. Howard, Jeffersonville, Ind.

Application September 24, 1945, Serial No. 618,390

6 Claims. (Cl. 126—38)

(Granted under the act of March 3, 1883, as amended April 30, 1928; 370 O. G. 757)

The invention described herein, if patented, may be manufactured and used by or for the Government for governmental purposes, without the payment to me of any royalty thereon.

The present invention relates to a portable single burner gasoline stove, and is an improvement on the invention disclosed in my application for Gasoline stove, Serial No. 531,443, filed April 17, 1944, now Patent No. 2,444,444, granted July 6, 1948.

It is an object of the invention to provide an improved casing and utensil support for the gasoline burner disclosed in my prior application.

It is a further object of the invention to provide a casing which has folding legs and a collapsible utensil support, the body of the casing being formed with a priming pan for preheating the stove burner.

Another object of the invention is the provision of a cylindrical wall, as a component of the portable gasoline stove, having cooking utensils supporting arms pivoted thereto, which arms may fold against the inside of the cylindrical wall for shipping purposes.

Further objects of my invention will be apparent from a consideration of the following description, taken in connection with the accompanying drawing, in which:

Fig. 1 is a side elevational view of the improved stove casing, the heater element being shown in dotted lines;

Fig. 2 is transverse sectional view through the upper cylindrical section of the casing, the utensil supporting arms being shown in full lines in their housed position, and in dotted lines in utensil supporting position;

Fig. 3 is a top plan view of the stove and casing.

Fig. 4 is a sectional view on the line 4—4 of Fig. 1.

Fig. 5 is a perspective view of one of the legs of the casing disassembled.

The heating unit shown at A may be substantially the same as that in my prior application, although other heaters of similar type may also be used with the improved casing and support. It comprises a heated fuel tank 10 having a cylindrical passage 11 therethrough. In the passage 11 there is a burner device 12 which receives fuel directly from the tank. The control stem 13 of the valve (not shown) of the burner 12 extends downwardly to the lower level of the tank, and has a T-head 14 for its operation. A removable flame tube 15 is inserted in the upper part of the cylindrical passage 11, the tube 15 terminating in a slightly enlarged portion 16 carrying a flame spreader 17 and forming a slot 18 for the flame.

The base of the stove of my prior application is replaced in the present invention by a casing having a base B and cylindrical section C, which provides supporting means, air admitting means, a cup for a priming charge, a wind shield for the heater and utensil supporting means. The utensil supporting means comprises a plurality of arms 19 which are foldable within the casing to reduce the bulk of the device for storage, and the stove supporting means comprises legs 20 which are collapsible against the side of the casing for the same purpose.

The cylindrical section C and base B are telescopically connected. The base B is generally dish-shaped, and has a central tube portion 22 adapted to be received within the lower part of the central passage 11 of the heater A. The tube 22 has slots 23 to receive the T-head 14 of the burner valve, so that the burner valve can be operated by rotating the heater and base relatively to one another as in my prior application.

The upwardly flaring bottom section 24 is secured to the central tubular part 22 and the lower portion of the resulting receptacle is adapted to receive a priming charge of gasoline or other liquid fuel. Near the outer border of the bottom portion 24 a row of air admitting apertures 25 is provided. The supporting legs 20 of the stove are also secured to this portion of the base. The outer edge of the base B terminates in an upwardly extending flange 27 over which the cylindrical wall of the upper portion C is telescoped.

The casing is provided with a plurality of legs 20, ordinarily four in number. Each leg 20 consists of an angle section 28, one portion of which is welded or otherwise secured to the bottom portion 24, and an angular foot 29 movably connected thereto. The two portions 28 and 29 are pivotally secured together by means of a loosely fastened rivet or bolt 30, the parts being normally maintained in contact by a spring 31 surrounding one end of the bolt or rivet 30. The upper angle portion 28 terminates in a downwardly turned tongue 32 which engages an aperture 33 in the foot portion 29 below the pivot point when the angle and foot portions are brought into alignment, the connection serving as a detent to cause the foot 29 to remain in a rigid supporting position. To collapse the leg, the foot 29 is pressed sidewise against the tension of the spring 31 until the tongue 32 is released from the aperture 33, whereupon the foot can be folded against the side of the casing, the angle of the foot portion corresponding to the angle between the bottom portion 24 of the base and the flange 27.

The upper part C of the casing consists of a sheet-metal body 34 having an inturned rim or flange 35 at the upper end. On the rim four utensil supporting arms 19 are swingably supported. Each arm 19 consists of a channel bar 36 having downwardly extending ears 37 at one end, and is thus substantially L-shaped. At each arm-securing position the rim 35 is provided with a recess formed by cutting out and depressing two ears 38 below the rim. The downwardly extending ears 37 of the channel arms are secured between the downwardly extending ears 38 of the rim by suitable means, as a rivet 39. The arms 19 when extended lie beyond the outer wall of the cylinder C and form an enlarged support for a cooking utensil. Because of their channel shape the arms 19 are strong in proportion to their weight. When the cylindrical part C of the casing is lifted from the base B the arms 19 can be turned within the casing, as in Fig. 2, and the casing then replaced on the base. Arms 19 are hinged at the inner margin of rim 35, to enable them to swing inwardly against the inner wall of part C, for packing and/or shipping.

When in the retracted position shown in Figure 2, arms 36 are retained inside casing C because they cannot pass unit A as long as casing C is in position on base B, and thus are protected against damage by accidental outward displacement caused by rough handling during transport of the portable stove.

The cylindrical casing C is non-rotatably connected with the heater element A by means of shoulders defining a U-shaped slot 40 in the lower edge, which is placed over the projecting filler plug 41 of the heater unit. Thus, rotation of the cylindrical upper part C of the casing with reference to the base B will operate the valve of the burner A.

It will be seen that the improved casing of this invention presents a construction which is collapsible to eliminate exterior projections and make the entire stove fit in a cooking utensil only slightly larger than the body of the casing itself.

A receptacle 42 to receive a priming charge for heating the burner is also provided by the bottom of the casing. Since the stove is supplied with fuel not by air pressure but by the vapor pressure of the heated gasoline in the tank, the provision of a priming pan is important, especially for use in the colder regions. When the stove is in operation it can easily be shut off by rotating the casing parts with relation to one another, or a wrench can be applied to the filler plug of the heater tank and the heater A and upper casing C rotated with relation to the base B.

I have described the preferred embodiment of my invention, but it is understood that desired modifications may be made within the scope of the appended claims.

Having thus described my invention, what I claim and desire to secure by Letters Patent is:

1. A stove comprising a vapor fuel burner, a casing comprising a base, said base being equipped with pivoted legs adapted to swing outwardly in stove-supporting position and inwardly against said base in compact position for packing, and a removable section mounted on said base, said removable section having a cylindrical wall surrounding the burner and having arms pivoted at the top of said section, said arms extending horizontally outward to support a cooking utensil and being swingable to a retracted position against the inside of said cylindrical wall when said section is removed from said base, each of said arms being hinged at the top of said cylindrical wall and being of sufficient length to be retained in said retracted position by said burner when said section is replaced on said base.

2. A stove comprising a vapor fuel burner, a casing having a base and a removable section mounted on the base, said removable section having a cylindrical wall surrounding the burner and having L-shaped arms pivoted at the top of said section, said arms extending horizontally outward to support a cooking utensil and being swingable to a retracted position against the inside of said cylindrical wall when said section is removed from said base, each of said arms being hinged at the top of said cylindrical wall and being of sufficient length to be retained in said retracted position by said burner when said section is replaced on said base.

3. A stove comprising a vapor fuel burner, a casing having a base and a removable section mounted on the base, said removable section having a cylindrical wall surrounding the burner and an inwardly extending horizontal flange at the top of said wall, said flange having L-shaped arms pivoted thereto to swing outwardly to be supported by the flange in horizontal position to receive a cooking utensil or to a retracted position against the inside of said cylindrical wall when said section is removed from said base, each of said arms being hinged to the inner margin of said horizontal flange and being of sufficient length to be retained in said retracted position by said burner when said section is replaced on said base.

4. A stove comprising a vapor fuel burner, a casing having a base and a removable section mounted on the base, said removable section having a cylindrical wall surrounding the burner and having arms pivoted at the top of said section, said arms extending horizontally outward to support a cooking utensil and being swingable to a retracted position against the inside of said cylindrical wall when said section is removed from said base, each of said arms being hinged at the top of said cylindrical wall and being of sufficient length to be retained in said retracted position by said burner when said section is replaced on said base.

5. A stove comprising a vapor fuel burner, a casing having a base and a removable section mounted on the base, said removable section having a cylindrical wall surrounding the burner and an inwardly extending horizontal flange at the top of said wall, said flange having arms pivoted thereto, said arms extending horizontally outward to support a cooking utensil and being swingable to a retracted position against the inside of said cylindrical wall when said section is removed from said base, each of said arms being hinged at the inner margin of said horizontal flange and being of sufficient length to be retained in said retracted position by said burner when said section is replaced on said base.

6. In a stove comprising a vapor fuel burner, a fuel reservoir having a lateral projection, and a casing having a base for rotatably seating said fuel reservoir: a separable cooking-utensil-supporting section comprising a cylindrical wall removably and rotatably mounted on said base, said cylindrical wall surrounding said burner unit and fuel reservoir and having shoulders defining an open slot at its lower end for receiving said projection whereby relative rotation of said cylindrical wall and said fuel reservoir is prevented, and said cylindrical wall having a plurality of arms pivoted at its top, said arms extending horizontally outward to support a cooking utensil and being swingable to a retracted position against the inside of said cylindrical wall when said cylindrical wall is removed from said base, each of said arms being hinged at the top of said cylindrical wall and being of sufficient length to be retained in said retracted position by said burner when said cylindrical wall is replaced on said base.

STYLES T. HOWARD.

REFERENCES CITED

The following references are of record in the file of this patent:

UNITED STATES PATENTS

| Number | Name | Date |
|---|---|---|
| 575,979 | Ostlund et al. | Jan. 26, 1897 |
| 683,160 | Dunlap | Dec. 4, 1900 |
| 2,154,305 | Goerl | Apr. 11, 1939 |
| 2,248,037 | Olsen | July 1, 1941 |
| 2,331,931 | Robinson | Oct. 19, 1943 |
| 2,354,221 | Robinson | July 25, 1944 |
| 2,397,766 | Tullis | Apr. 2, 1946 |

FOREIGN PATENTS

| Number | Country | Date |
|---|---|---|
| 76,620 | Germany | of 1894 |